(12) United States Patent
Roth et al.

(10) Patent No.: US 7,866,183 B2
(45) Date of Patent: Jan. 11, 2011

(54) DRINK BOTTLE AND METHOD OF MANUFACTURING SAME

(76) Inventors: Donna Roth, 10 Cordage Park Cir., Suite 212, Plymouth, MA (US) 02360; Henry Roth, 10 Cordadge Park Cir., Suite 212, Plymouth, MA (US) 02360

( * ) Notice: Subject to any disclaimer, the term of this patent is extended or adjusted under 35 U.S.C. 154(b) by 1044 days.

(21) Appl. No.: 11/538,311

(22) Filed: Oct. 3, 2006

(65) Prior Publication Data

US 2008/0078200 A1    Apr. 3, 2008

(51) Int. Cl.
*F25D 3/08* (2006.01)
(52) U.S. Cl. ...................................... 62/457.3
(58) Field of Classification Search ............... 62/457.1, 62/457.3, 457.4, 457.5; 220/253
See application file for complete search history.

(56) References Cited

U.S. PATENT DOCUMENTS

| | | | |
|---|---|---|---|
| 2,527,991 A | 10/1950 | Greenberg | |
| 3,239,089 A | 3/1966 | Moylan | |
| 4,473,540 A | 9/1984 | Fredette | |
| 4,779,722 A | 10/1988 | Hall | |
| 5,085,330 A | 2/1992 | Paulin | |
| 5,275,298 A | 1/1994 | Holley, Jr. et al. | |
| 5,312,014 A | 5/1994 | Hamlin | |
| 5,540,341 A | 7/1996 | Holley et al. | |
| 5,823,380 A | 10/1998 | Cox | |
| 6,415,624 B1 * | 7/2002 | Connors et al. | 62/457.3 |
| 6,705,491 B1 | 3/2004 | Lizerbram et al. | |
| 6,945,393 B2 | 9/2005 | Cho | |
| 2004/0050868 A1 | 3/2004 | Lizerbram et al. | |
| 2004/0066705 A1 | 4/2004 | Linz et al. | |

FOREIGN PATENT DOCUMENTS

| | | |
|---|---|---|
| JP | 63-57980 | 4/1988 |
| JP | 6-29431 | 4/1994 |
| JP | 7-10172 | 1/1995 |
| WO | 93/11049 | 6/1993 |

OTHER PUBLICATIONS

English-language translation of Japanese Office Action issued in corresponding Japanese Application 2007-260234 (Sep. 7, 2010).

* cited by examiner

*Primary Examiner*—Melvin Jones
(74) *Attorney, Agent, or Firm*—Steven M. Jensen; Edwards Angell Palmer & Dodge LLP (57) ABSTRACT

A drink bottle and method of manufacturing same.

29 Claims, 7 Drawing Sheets

DRINK BOTTLE AND METHOD OF MANUFACTURING SAME

BACKGROUND

The present invention relates to drink bottles and, more particularly, to drink bottles that can separately store a consumable beverage and at least one additive until mixing is desired.

The vast majority of conventional drink bottles have a single compartment for storing a consumable beverage and are unable to separately store a flavoring for later mixing with the beverage. Certain crude dispenser mechanisms are currently available to keep flavorings separate from a consumable beverage, but such mechanism involve using one time dispensers that rip foil or the like to dispense flavoring. This prevents the drink bottles from being reused as a container to separately store consumable beverages from additives. Additionally, many of the crude dispensers are located in the bottle spouts to also function as a bottle cap and thereby reduce the flow of liquid from the bottle after use.

Conventional drink bottles that have crude one time use dispenser mechanisms are also unable to keep beverages cool or warm prior to use. Prior art thermal energy storage packs are generally known for use in maintaining the contents of a storage container in a heated or cooled state. For example, frozen thermal packs are pre-filled with a thermal energy storage material which can be frozen and then placed alongside food in an insulated container, such as a cooler, in order to maintain the cooler contents, such as food and drinks, in a cold state for a predetermined time period. Such thermal energy materials generally have 10-15 times the thermal capacity of frozen water and therefore maintain the cooler contents in a cold state for an extended period of time in comparison to ice alone. Such cold packs can be reused numerous times by refreezing them between use, and also avoid the problem of melting liquid contacting the items in the cooler. However, it is not always convenient, if at all possible, to fit a cold pack in a drink bottle.

Energy storage materials which maintain heat are also known which can be preheated in a microwave or through other means, and then placed in a cooler in order to provide heat within the cooler to keep food storage containers in the box warm for a predetermined time period. These heat or cold packs generally come in predetermined sizes which are not always suitable for use with a drink bottle, if suitable at all.

It may be advantageous to provide a drink bottle that can separately house a consumable beverage from at least one additive prior to use; that is preferably reusable; that can preferably heat and/or cool a consumable beverage prior to consumption; that preferably does not interfere with the flow of liquid from the bottle spout after mixing contents within the bottle; and that is relatively easy to operate for children as well as adults.

SUMMARY

Briefly speaking, one embodiment of the present invention is directed to a two compartment drink bottle for a consumable beverage. The drink bottle includes a first compartment defining a cavity adapted to hold the consumable beverage. The first compartment includes an inner panel forming the cavity. An outer panel, in combination with the inner panel, forms a chamber generally coextensive with the outer panel. A thermal energy storage material is located within the chamber. A second compartment is detachably secured to the first compartment and is adapted to hold at least one additive. The second compartment includes at least one channel that is moveable between a first position, in which the at least one channel is positioned to form at least one passageway connecting the first and second compartments, and a second position, in which the at least one channel is positioned so that the first and second compartments are separated. A lid is detachably engaged with the second compartment. The drink bottle is adapted to allow consumable beverage from the first compartment to enter the second compartment when the at least one channel is in the first position.

In a separate aspect, the present invention is directed to a two compartment drink bottle for a consumable beverage. The drink bottle includes a first compartment defining a cavity adapted to hold the consumable beverage. A second compartment is detachably secured to the first compartment and is adapted to hold at least one additive. The second compartment includes at least one channel that is moveable between a first position, in which the at least one channel is positioned to form at least one passageway connecting the first and second compartments, and a second position, in which the at least one channel is positioned so that the first and second compartments are separated. A lid is detachably engaged with the second compartment. The drink bottle is adapted to allow consumable beverage from the first compartment to enter the second compartment when the at least one channel is in the first position.

In a separate aspect, the present invention is directed to a two compartment drink bottle for a consumable beverage. The drink bottle includes a first compartment defining a cavity adapted to hold the consumable beverage. A second compartment is located on the first compartment and is adapted to hold at least one additive. The second compartment includes at least one channel that is moveable between a first position, in which the at least one channel is positioned to form at least one passageway connecting the first and second compartments, and a second position, in which the at least one channel is positioned so that the first and second compartments are separated. A lid is detachably engaged with the second compartment, the drink bottle is adapted to allow consumable beverage from the first compartment to enter the second compartment when the at least one channel is in the first position. The at least one channel is moved between the first and second positions by rotating the lid.

In a separate aspect, the present invention is directed to a method of assembling a drink bottle. The method includes: providing a first compartment defining a cavity adapted to hold a consumable beverage therein, the first compartment defining a mouth; providing a second compartment adapted to hold at least one additive; attaching the second compartment to the first compartment such that the mouth can be sealed closed; and attaching a lid to the second compartment, wherein rotating the lid in a fist direction results in the creation of at least one passageway between the first and second compartments and rotating the lid in a second, opposite direction results in separating the first and second compartments.

In another aspect, the present invention is directed to a reusable two compartment drink bottle for a consumable beverage and is adapted to at least one of heat and cool the consumable beverage. The drink bottle includes a first compartment defining a cavity adapted to hold the consumable beverage. The first compartment includes an inner panel forming the cavity. An outer panel, in combination with the inner panel, forms a chamber generally coextensive with the outer panel. A thermal energy storage material is located within the chamber. A second compartment is located on the first compartment and is adapted to hold at least one additive. The second compartment includes at least one channel that is moveable between a first position, in which the at least one channel is positioned to form at least one passageway connecting the first and second compartments, and a second position, in which the at least one channel is positioned so that the first and second compartments are separated. A lid is located on the second compartment. The drink bottle is adapted to allow consumable beverage from the first compartment to enter the second compartment when the at least one channel is in the first position.

In another aspect, the present invention is directed to a reusable two compartment drink bottle for a consumable beverage. The drink bottle includes a first compartment defining a cavity adapted to hold the consumable beverage. A second compartment is located on the first compartment and is adapted to hold at least one additive. The second compartment includes at least one channel that is moveable between a first position, in which the at least one channel is positioned to form at least one passageway connecting the first and second compartments, and a second position, in which the at least one channel is positioned so that the first and second compartments are separated. A lid is located on the second compartment. The drink bottle is adapted to allow consumable beverage from the first compartment to enter the second compartment when the at least one channel is in the first position. The at least one channel is moved between the first and second positions by rotating the lid.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the drink bottle and designated parts thereof. The term "additive", as used in the claims and corresponding portions of the specification, means "any one or combination of powder, solids, liquid, secondary consumable beverage, flavoring, supplement, or the like". It is noted that consumable beverage could be positioned in the second compartment and the at least one additive could be positioned in the first compartment without departing from the scope of the present invention. Accordingly, the term "adapted to hold a consumable beverage", as used in the claims and in corresponding portions of the specification, is not exclusive but can include "any consumable beverage, soup, yogurt, additive, ice cream, or other foodstuff or supplement" in addition to the consumable beverage it is capable of receiving. Similarly, the term "adapted to hold at least one additive", as used in the claims and in corresponding portions of the specification, is not exclusive but can include "any consumable beverage, soup, yogurt, ice cream, or other foodstuff or supplement" in addition to the additive it is capable of receiving. The language "at least one of 'A', 'B', and 'C'," as used in the claims and in corresponding portions of the specification, means "any group having at least one 'A'; or any group having at least one 'B'; or any group having at least one 'C';—and does require that a group have at least one of each of 'A', 'B', and 'C'." Additionally, the words "a" and "one" are defined as including one or more of the referenced item unless specifically stated otherwise. The terminology includes the words above specifically mentioned, derivatives thereof, and words of similar import.

Referring to FIGS. 1-9, wherein like numerals indicate like elements throughout, a preferred embodiment of a drink bottle according to the present invention is shown and generally designated as 10. Briefly speaking the drink bottle 10 is preferably a reusable bottle which allows a person to keep a consumable beverage 20 and additives 62 separate until desired.

Figure 1:
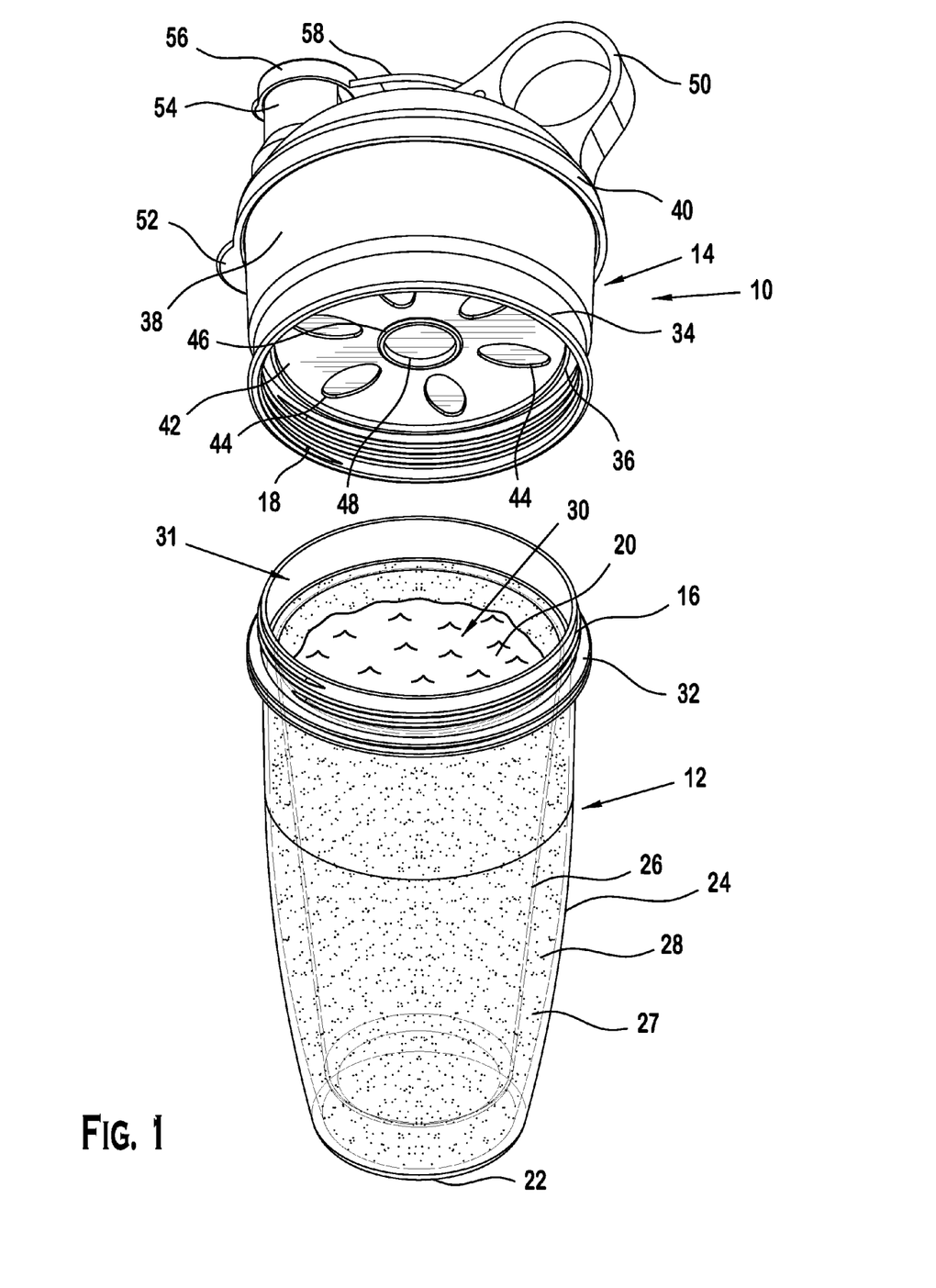
FIG. 1 is a partially exploded, perspective view of a drink bottle according to a preferred embodiment of the present invention illustrating a second compartment and lid separated from a first compartment; the first compartment is shown in the bottom of the figure as containing a consumable beverage; the first compartment is preferably, but not necessarily, formed by inner and outer panels which contain thermal energy storage material therebetween; a second compartment is shown in the top of the figure that is adapted to hold at least one additive therein; the bottom of the second compartment is preferably formed by a base plate having openings therethrough; the openings are shown as being blocked by portions of a rotateable plate that is located along an inner surface of the base plate.

As shown in FIG. 1, the present invention relates to a drink bottle 10 comprised of a first compartment 12, a second compartment 14, and a lid 40. The drink bottle 10 is preferably made of a durable, cleanable, food safe polymeric material, such as polyethylene terephthalate (PET), polyvinyl chloride (PVC), polyphthalate carbonate (PPC) or any other suitable material. For example, the drink bottle can be formed of aluminum or food grade steel without departing from the scope of the present invention.

The drink bottle 10 may include thermal energy storing material 28. The thermal energy storage material 28 is preferably a gelatinous material that is formed of re-freezable material and/or re-heatable material, such as the non-toxic materials used in gel packs and the like. However, those of ordinary skill in the art will appreciate from this disclosure that any suitable chillable or heatable material can be used without departing from the scope of the present invention.

Referring to FIG. 1, a two compartment drink bottle 10 for a consumable beverage is shown. The drink bottle 10 is preferably reusable and is adapted to at least one of heat and cool the consumable beverage 20.

The drink bottle 10 includes a first compartment 12 shown in the bottom of FIG. 1. The first compartment 12 defines a cavity 30 that is adapted to hold the consumable beverage 20. The first compartment 12 can be single paneled or double paneled (as shown in the Figures) with thermal energy storage material 28 located therebetween. The first compartment preferably includes an inner panel 26 that forms a cavity for receiving a consumable beverage 20. An outer panel 24, in combination with the inner panel 26, forms a chamber 27 that is generally coextensive with the outer panel 24.

The inner and outer panels 24, 26 are preferably generally translucent so that the thermal energy storage material 28 in the chamber 27 affects the look of the first compartment 12. The inner and outer panels 24, 26 are preferably non-detachably fixed to each other via sonic welding, adhesive or the like.

The first compartment preferably has a generally circular mouth 31. Around the outside of the mouth 31 is a lip 32 that extends generally radially outwardly from the first compartment 12. At least one thread 16 is preferably located above the lip 31 for engaging the second compartment 14. Thermal energy storage material 28 is preferably located within the chamber 27. The first compartment 12 preferably extends upwardly from a base 22 such that a cross-section taken perpendicularly to a longitudinal axis is generally circular along the height of the first compartment 12.

The second compartment 14 is preferably detachably secured to the first compartment 12 via a threaded connection and is adapted to hold at least one additive 62. A collar 34 preferably extends downwardly from the base of the second compartment and contains a thread 18 on an inner surface. However any mechanism can be used to detachably or permanently fix the first and second compartments 12, 14 without departing from the scope of the present invention. A spoon/scoop 60 (shown in FIG. 2) can be used to place additive 62 into the bottle 10. However, those of ordinary skill in the art will appreciate from this disclosure that the second compartment 14 can be non-detachably attached to the first compartment 12 without departing from the scope of the present invention.

As best shown in FIGS. 2, 7, 7A, and 8, the second compartment 14 includes at least one channel 66. The channels 66 are preferably oval shaped. However, any suitable shape can be used. By moving a rotateable plate 64, the channel(s) 66 can be moved between a first position (shown in FIGS. 6A and 7A), in which the at least one channel 66 is positioned to form at least one passageway 86 connecting the first and second compartments 12, 14, and a second position (shown in FIGS. 7 and 9), in which the at least one channel 66 is positioned so that the first and second compartments 12, 14 are separated.

Figure 2:
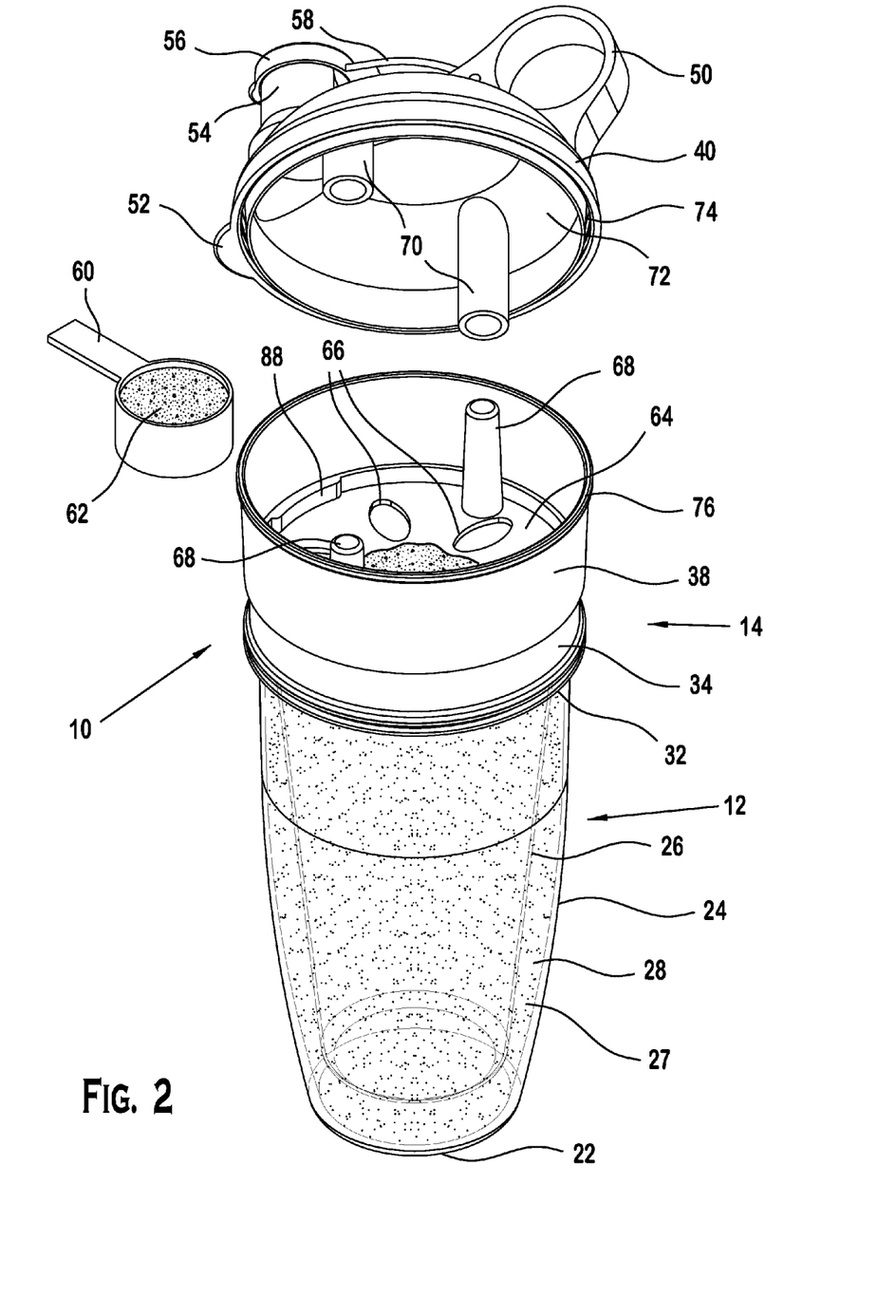
FIG. 2 is a partially exploded, perspective view of the drink bottle of FIG. 1 illustrating the lid separated from the first and second compartments; Inside the second compartment is a rotateable plate which defines channels therethrough; On top of the rotateable plate are guide posts; On the inner surface of the lid are shafts which extend generally downwardly to mate with the guide posts; a scoop containing additive is shown; The lid includes a circumferential groove on a lower end which receives the upper edge of the second compartment to allow the lid to rotate along the second compartment.
Figure 8:
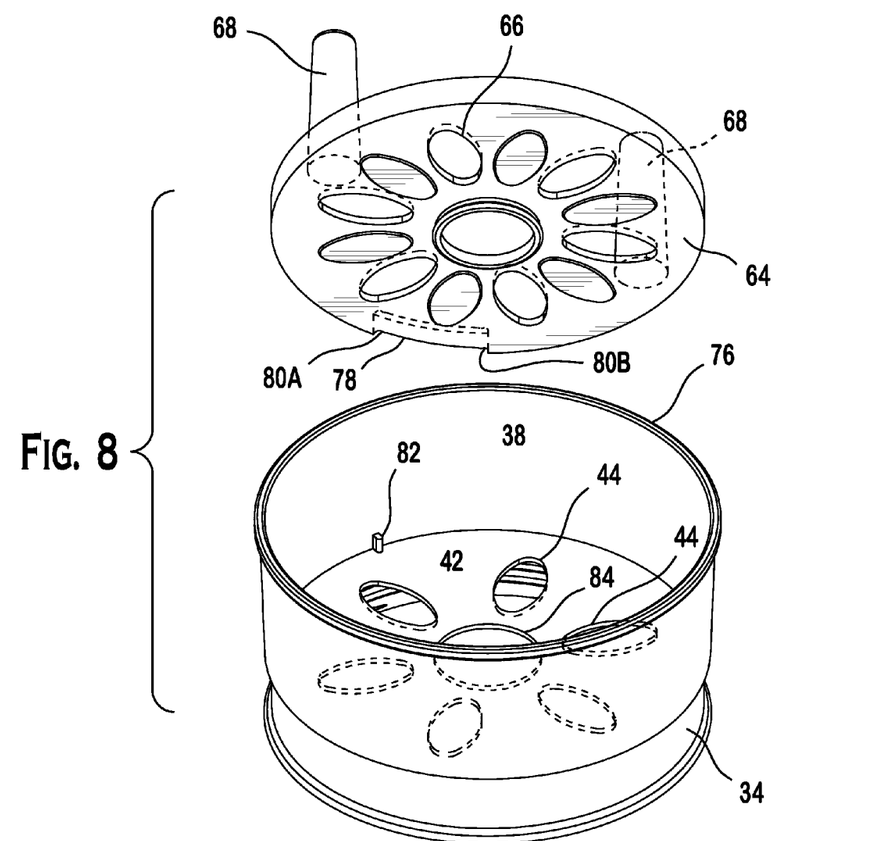
FIG. 8 is an exploded view of the second compartment of the drink bottle of FIG. 1 illustrating the rotateable plate separated from the base plate; A shaft extends downwardly from the rotateable plate and has an outwardly extending flange on a distal end thereof, The flange can preferably be forced through the bore in the base plate due to the elasticity of the material to rotateably secure the two plates together.
Figure 9:
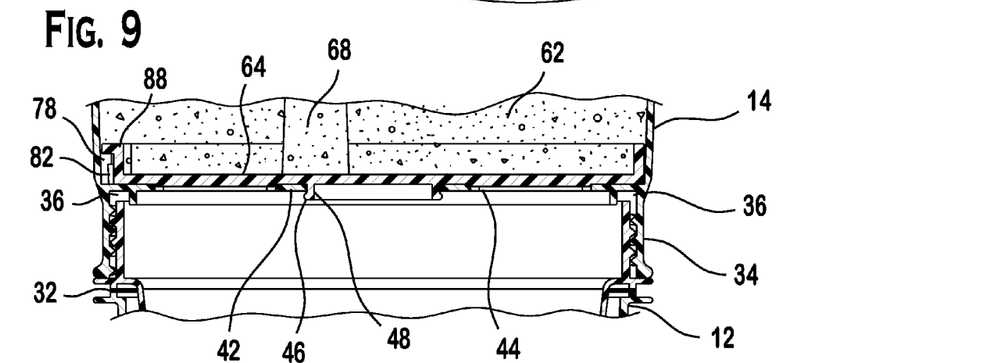
FIG. 9 is a broken away, cross-sectional view of the drink bottle of FIG. 1 illustrating the channels in the second position to maintain the separation of the consumable beverage and the at least one additive.

Referring to FIGS. 2 and 8, the second compartment 14 preferably has a generally circular cross section. it is preferable that the cross sections of the first and second compartments 12, 14 are generally equal so that when the first and second compartments 12, 14 are positioned end to end, they preferably form a generally cylindrically shaped drink bottle 10. The second compartment 14 preferably includes an annular panel 38 which forms a sidewall and has a bottom formed by a base plate 42. The base plate 42 may define openings 44 therethrough. The number and shape of the openings 44 is preferably, but not necessarily, the same as the channels 66 in the rotateable plate 64.

The rotateable plate 64 is preferably rotateably connected to the base plate 42 and defines at least one channel 66 therethrough. When the rotateable plate is configured so that the channel(s) 66 are in the first position, the at least one opening 44 and the at least one channel 66 are aligned to form at least one passageway 86 connecting the first and second compartments 12, 14.

Figure 6:
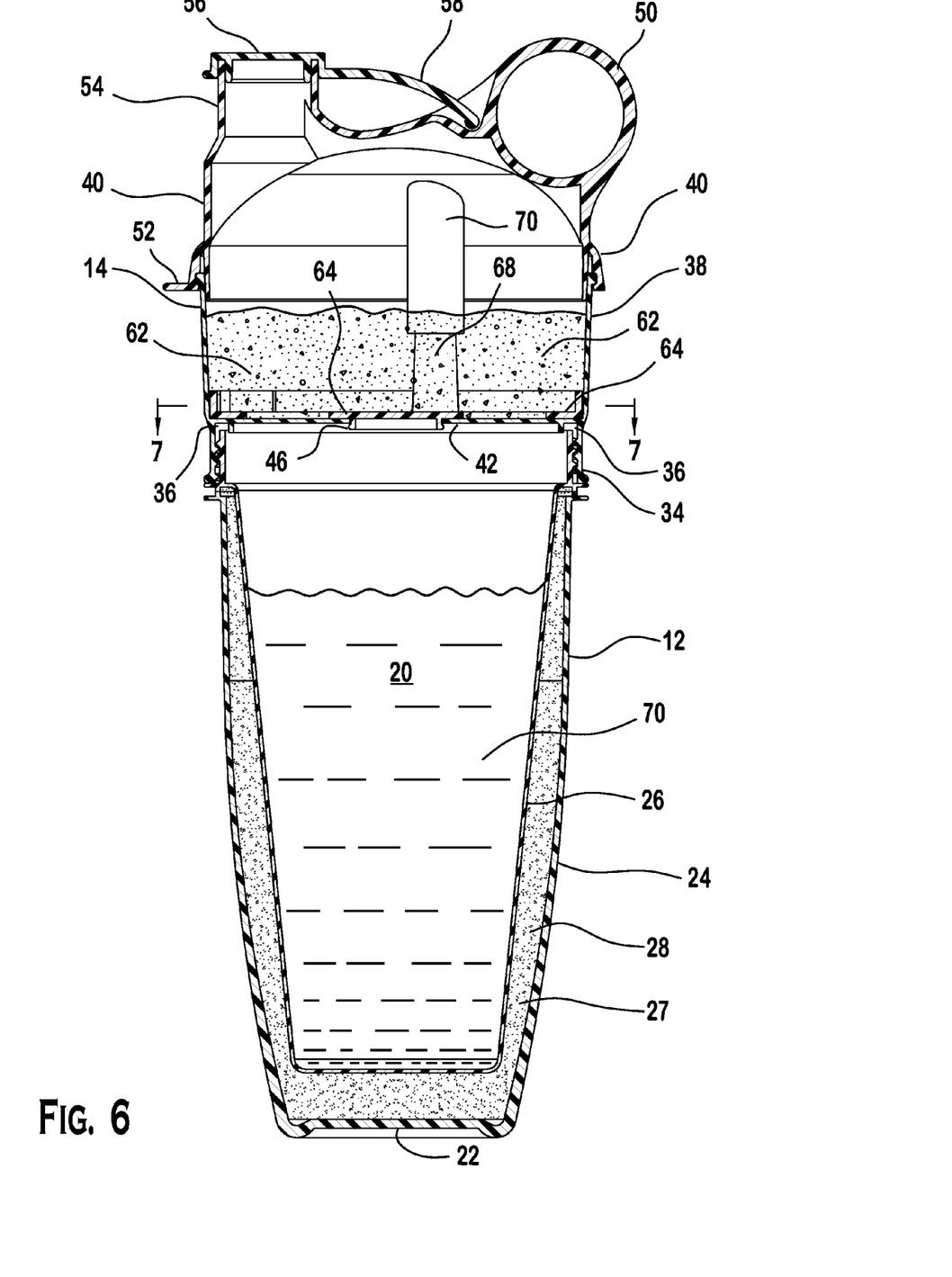
FIG. 6 is a cross-sectional view of the drink bottle of FIG. 5 as taken along the line 6-6 of FIG. 5 illustrating the drink bottle holding a consumable beverage and at least one additive in separate compartments; the rotateable plate is configured so that the channels therethrough are blocked by portions of the base plate; The shafts of the lid are engaged with the guide posts of the rotateable plate.
Figure 6A:
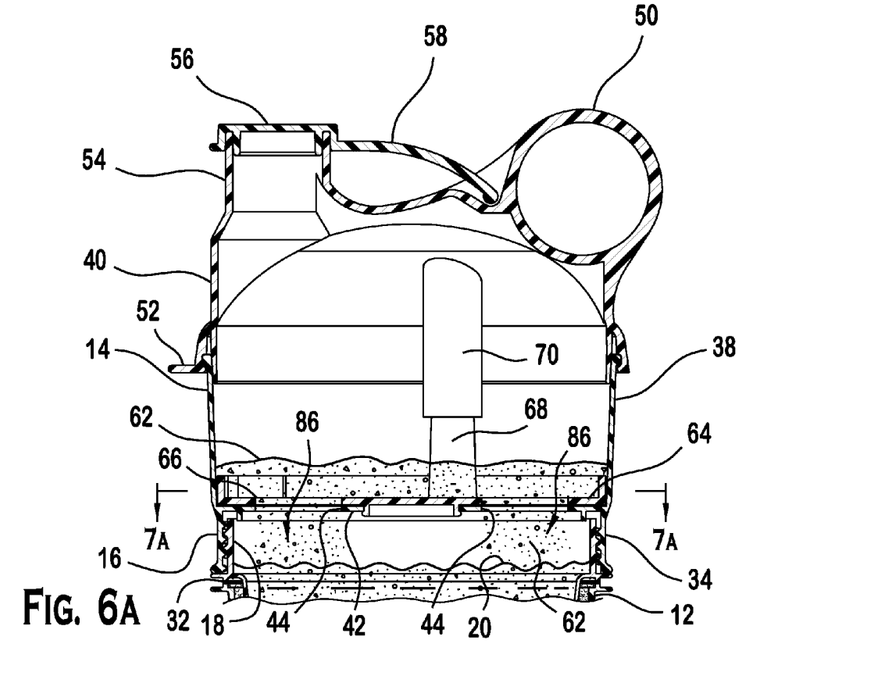
FIG. 6A is a broken away, cross-sectional view similar to FIG. 6 illustrating the drink bottle in the process of allowing the consumable beverage and at least one additive to mix; The channels in the rotateable plate are in the first position and are aligned with openings in the base plate to form at least one passageway allowing fluid flow, additive transfer, and mixing to occur between the two compartments.

Referring to FIGS. 6 and 6A, it is preferable that at least one guide post 68 is located on the rotateable plate 64. The guide post 68 preferably extends generally upwardly from the top of the rotateable plate 64 and has a generally conical shape. It is preferred that at least one shaft 70 extends generally downwardly from the inner surface 72 of the lid 40. The shaft 70 is preferably cylindrical and sized to slide over the guide post 68 to engage the lid 40 with the rotateable plate 64 so that rotating the lid 40 will rotate the rotateable plate 64. It is preferred, but not necessary, that the drink bottle 10 include two guide posts 68 and two shafts 70 that slide thereover. However, those of ordinary skill in the art will appreciate from this disclosure that the lid 40 can be fixed to the second compartment 14 without departing from the scope of the present invention.

If the lid 40 does not rotate the rotateable plate 64, then the rotateable plate 68 can be moved by twisting a portion of the second compartment 14, by manipulating a lever, or any other suitable mechanism, including a powered switch and solenoid. In one embodiment the first and second compartments 12, 14 can be fixed together and the lid 40 can be attached, either permanently or not, to the second compartment 14 without departing from the scope of the present invention. In this case, a switch or other mechanism can be used to form the passageways 86 using the channels 66 and the liquid can be introduced through the lid cover 56 and through the passageways 86 into the first compartment cavity 30. Then, the channels 66 can be moved to separate the first and second compartments 12, 14 and the at least one additive can be inserted through the lid cover.

Figure 7:
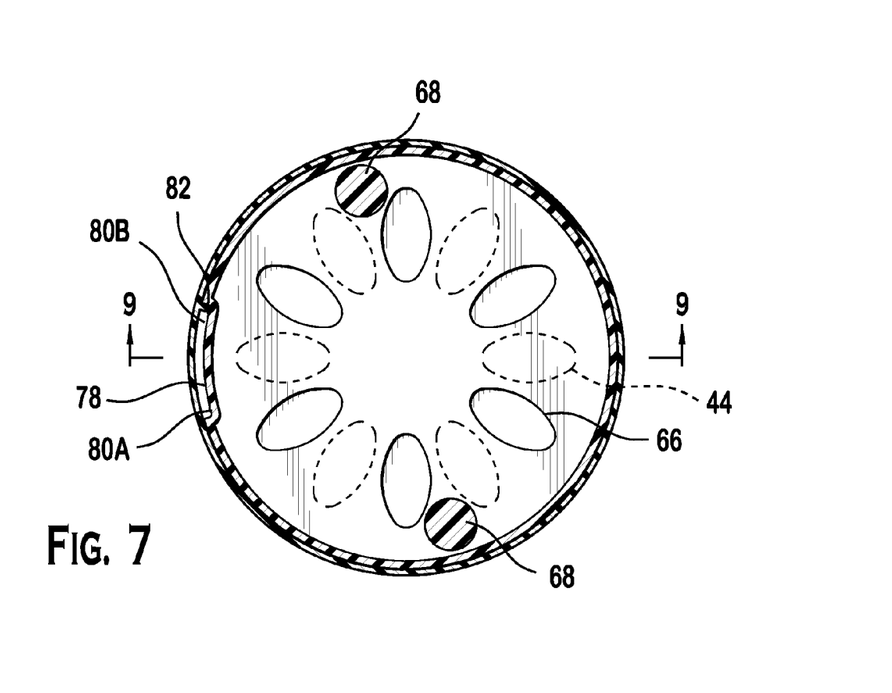
FIG. 7 is a cross-sectional view of the drink bottle of FIG. 6 as taken along the line 7-7 of FIG. 6 illustrating the rotateable plate configured so that the at least one channel is in the second position such that the first and second compartments are separated; A guide slot is located along a portion of the perimeter of the rotateable plate; The rotateable plate has first and second protuberances that extend into the guide slot; The second protuberance is shown engaged with a stop that is located on an inner surface of the second compartment to provide resistance to the rotateable plate being moved such that the channels are moved out of the second position.
Figure 7A:
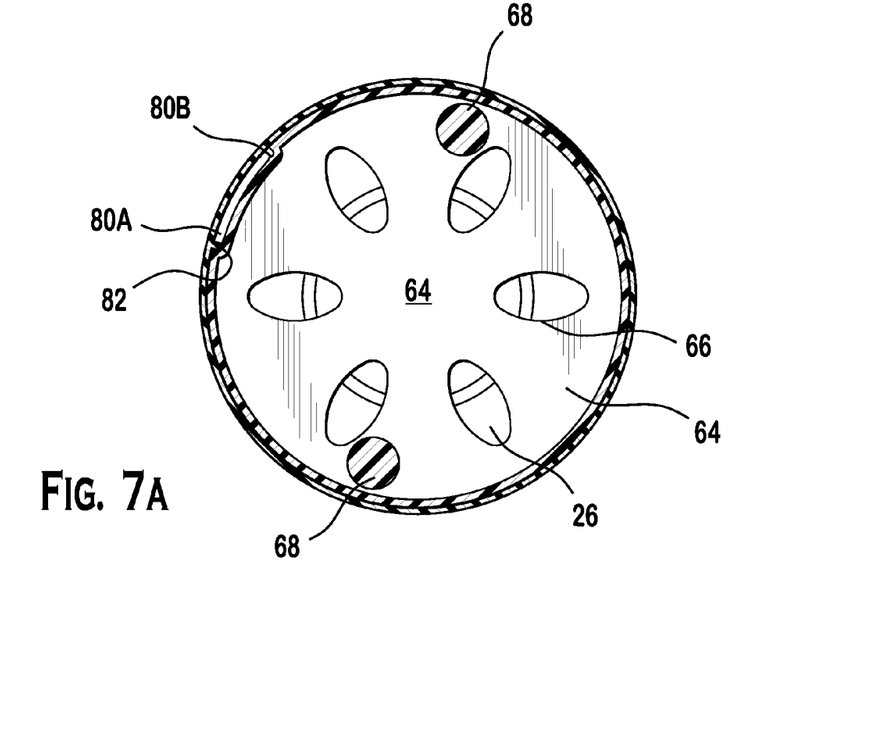
FIG. 7A is a cross-sectional view similar to that of FIG. 7 in which the rotateable pate is configured so that the at least one channel is in the first position such that the at least one channel is aligned with the at least one opening to form at least one passageway connecting the first and second compartments; The first protuberance is shown engaged with the stop that is located on the inner surface of the second compartment to provide resistance to the rotateable plate being moved such that the channels are moved out of the first position.

Referring to FIGS. 7 and 7A, the rotateable plate 64 preferably includes a guide slot 78 along at least a portion of a perimeter thereof. The rotateable plate 64 preferably includes first and second protuberances 80A, 80B that extend into the guide slot 78. As best shown in FIG. 8, a stop is preferably located along an inner wall of the second compartment for slideable engagement with the guide slot 78. The first and second protuberances 80A, 80B are configured to provide resistance against the rotateable plate 64 moved so that the at least one channel 66 is moved from any one of the first and second positions (shown in FIGS. 7A and 7, respectively).

Referring to FIGS. 1 and 2, a slot cover 79 preferably extends from the rotateable plate 64 to cover the guide slot 78 and the stop 82 to reduce the amount of bottle 10 contents that enter the guide slot 78 which can potentially interfere with the smooth operation between the stop 82 and the guide slot 78.

Referring to FIGS. 2 and 6, a lid 40 is preferably detachably engaged with the second compartment 14. The drink bottle 10 is adapted to allow consumable beverage 20 from the first compartment 12 to enter the second compartment 14 when the at least one channel 66 is in the first position. It is preferred that the at least one channel 66 is moved between the first and second positions by rotating the lid 40. As best shown in FIG. 2, the lid 40 may include a circumferential groove 74 which is configured to receive an upper edge 76 of the second compartment 14. The circumferential groove 74 allows the lid 40 to slide over the upper edge 76 of the second compartment 14.

Figures 3, 4:
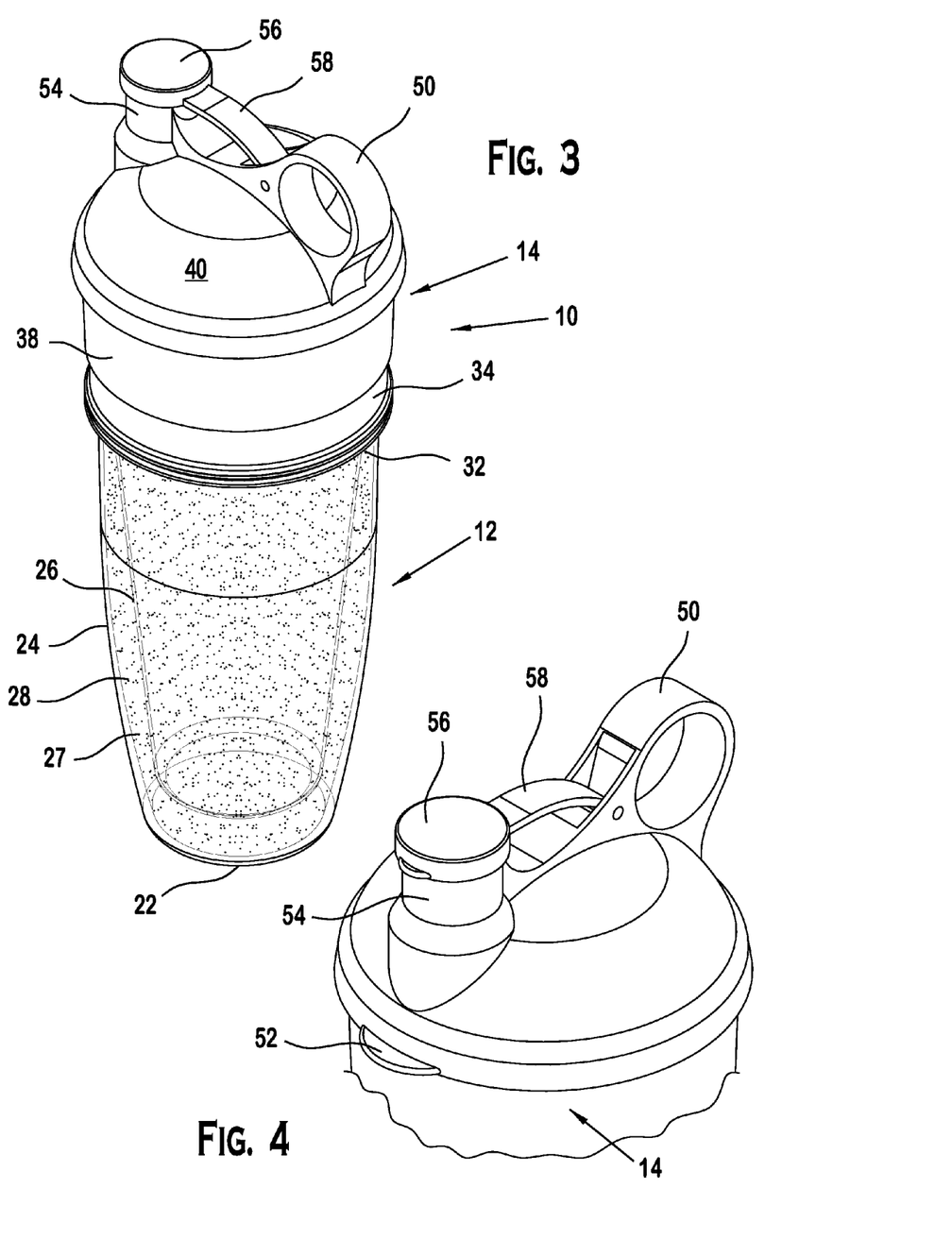
FIG. 3 is perspective view of the drink bottle of FIG. 1 fully assembled.
FIG. 4 is an enlarged, broken away, perspective view of the drink bottle of FIG. 1 illustrating the lid and a portion of the second compartment.
Figure 5:
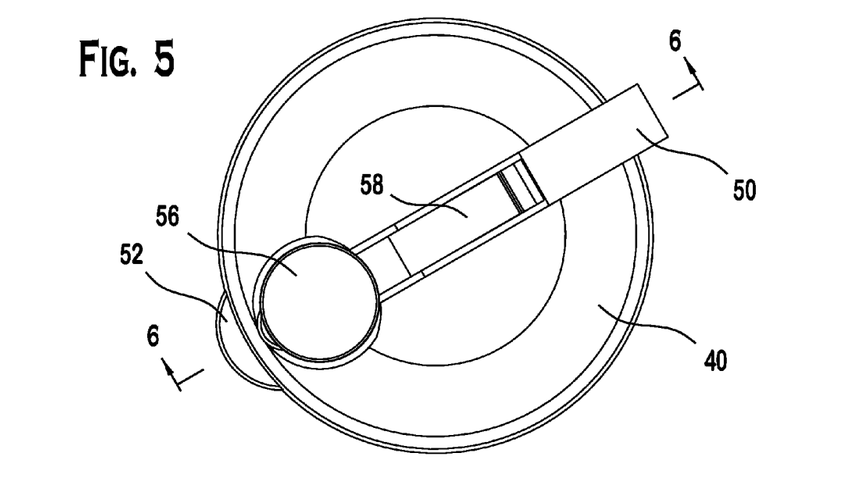
FIG. 5 is a top plan view of the lid of the drink bottle of FIG. 1.

Referring to FIGS. 3 and 4, the lid may include a cover 56 which can be detached or moved to allow a user to drink from the bottle. A cover strap 58 can be used to secure the cover 56 to the lid 40. The lid 40 may also include a handle 60 thereon. The lid may also include a tab to facilitate removal of the lid 40 in the event that the lid 40 is not fixed to the second compartment 14. The drink bottle 10 is preferably configured so that after the at least one passageway 86 is used to mix the consumable beverage 20 and at least one additive 62, the at least one channel 66 can be moved into the second position such that the drink bottle 10 is again configured to keep the first and second compartments separate 12, 14 so that the bottle can be reused.

A method of assembling a drink bottle 10 according to one aspect of the present invention is as follows. The steps of the present invention can be performed in any order without departing from the scope of the present invention. The method includes providing a first compartment 12 defining a cavity 30 adapted to hold a consumable beverage 20 therein. The first compartment 12 defining a mouth 31. Providing a second compartment 14 adapted to hold at least one additive 62. Attaching the second compartment 14 to the first compartment 12 such that the mouth 31 can be sealed closed. Attaching a lid 40 to the second compartment 14, wherein rotating the lid 40 in a fist direction results in the creation of at least one passageway 86 between the first and second compartments 12, 14 and rotating the lid 40 in a second, opposite direction results in separating the first and second compartments 12, 14, wherein operation of the drink bottle 10 does not result in damage to the portions that separate the first and second compartments 12, 14 thus allowing the drinking bottle 10 to be reused to again keep another consumable beverage and another at least one additive separate using the first and second compartments 12, 14.

Referring to FIGS. 1-9, one embodiment of the drink bottle 10 operates as follows. The first compartment 12 is chilled in a refrigerator or heated in a microwave. Then, a consumable beverage 20 is positioned in the cavity 30 of the first compartment.

Afterwards, the collar 34 of the second compartment 14 is inserted over the mouth 31 of the first compartment 12 and the first and second compartments 12, 14 are threaded together. The first and second compartments 12, 14 are preferably threaded together until the upper portion of the first compartment 12 abuts the gasket 36 in the bottom of the second compartment 14.

The stop 82 is preferably engaged with the second protuberance 80B to secure the channels 66 in the second position separating the first and second compartments 12, 14. At least one additive 62 can be placed inside the second compartment 14 using a spoon/scoop 60 or the like or just added directly into the second compartment.

Then, the lid 40, is positioned so that the lid shafts 70 are aligned over the rotateable plate guide posts 68. Then the lid 40 is lowered downward onto the second compartment 14 so that the upper edge 76 of the second compartment 14 is inserted into the circumferential groove 74 in the lid 40 and the lid shafts 70 are slid over the guide posts 68. Then the cover 56 is secured in the closed position and the drink bottle is ready for transport and/or use.

Once the mixture of the consumable beverage 20 and additive is desired, the user rotates the lid 40 which causes the rotateable plate 64 to move into the first position due to the engagement of the shafts 70 and guide posts 68. When moving the rotateable plate 64 from the second to first positions, the rotateable plate is rotated with sufficient torque to cause the stop 82 to go past the second protuberance 80B, slide through the guide slot 78, and to go past the first protuberance 80A so that the drink bottle 10 will be secured in the first position.

When the drink bottle has the channels 66 in the first position, at least one passageway 86 is formed between the first and second compartments allowing the consumable beverage 20 and additive to mix. Then a user can shake the drinking bottle to speed up mixing if desired. Then when a user wants to drink the mixture, the cover 56 is removed for drinking.

While various shapes, configurations, and features have been described above and shown in the drawings for the various embodiments of the present invention, those of ordinary skill in the art will appreciate from this disclosure that any combination of the above features can be used without departing from the scope of the present invention. For example, the drink bottle can have a cross section that is rectilinear instead of circular. Additionally, a second drinking spout can be attached directly to the first compartment to allow consumption of the consumable beverage 20 without mixing the additive 62 with the beverage 20. Furthermore, the second compartment 14 can also include thermal energy storage material 28 without departing from the scope of the present invention. Accordingly, it is recognized by those skilled in the art that changes may be made to the above described embodiments of the drink bottle without departing from the broad inventive concept thereof. It is understood, therefore, that this invention is not limited to the particular embodiments disclosed, but is intended to cover all modifications which are within the spirit and scope of the invention as defined by the appended claims and/or shown in the attached drawings.

What is claimed is:

1. A reusable two compartment drink bottle for a consumable beverage and adapted to at least one of heat and cool the consumable beverage, the drink bottle comprising:
   a first compartment defining a cavity adapted to hold the consumable beverage, the first compartment comprising:
      an inner panel forming the cavity;
      an outer panel, in combination with the inner panel, forms a chamber generally coextensive with the outer panel; and
      a thermal energy storage material located within the chamber;
   a second compartment detachably secured to the first compartment and adapted to hold at least one additive, the second compartment comprises at least one channel that is moveable between a first position, in which the at least one channel is positioned to form at least one passageway connecting the first and second compartments, and a second position, in which the at least one channel is positioned so that the first and second compartments are separated;
   a lid detachably engaged with the second compartment, wherein the drink bottle is adapted to allow consumable beverage from the first compartment to enter the second compartment when the at least one channel is in the first position.

2. The drink bottle of claim 1, wherein the at least one channel is moved between the first and second positions by rotating the lid.

3. The drink bottle of claim 2, wherein the lid includes a circumferential groove which is configured to receive an upper edge of the second compartment, wherein the circumferential groove allows the lid to slide over the upper edge of the second compartment.

4. The drink bottle of claim 1, wherein the second compartment comprises:
   a base plate which defines at least one opening therethrough;
   a rotateable plate rotateably connected to the base plate and defining the at least one channel therethrough, wherein the at least one opening and the at least one channel are aligned to form at least one passageway when the rotateable plate is configured so the at least one channel is in the first position.

5. The drink bottle of claim 4, further comprising:
   at least one guide post located on the rotateable plate; and
   at least one shaft located on an inner surface of the lid and configured to engage the at least one guide post so that rotating the lid will rotate the rotateable plate.

6. The drink bottle of claim 5, wherein the drink bottle includes two guide posts and two shafts, wherein the two shafts engage the two guide posts by sliding over a portion of the two guide posts.

7. The drink bottle of claim 5, wherein the rotateable plate includes a guide slot along a portion of a perimeter thereof.

8. The drink bottle of claim 7, wherein the rotateable plate includes first and second protuberances which extend into the guide slot.

9. The drink bottle of claim 8, further comprising a stop located in the second compartment for slidable engagement with the guide slot, wherein the first and second protuberance are configured to provide resistance against the rotateable plate being moved so that the at least one channel is moved from any one of the first and second positions.

10. The drink bottle of claim 1, wherein the inner and outer panels are generally translucent so that the thermal energy storage material in the chamber affects the look of the first compartment.

11. The drink bottle of claim 10, wherein the inner and outer panels are non-detachably fixed to each other.

12. A reusable two compartment drink bottle for a consumable beverage, the drink bottle comprising:
   a first compartment defining a cavity adapted to hold the consumable beverage;
   a second compartment detachably secured to the first compartment and adapted to hold at least one additive, the second compartment comprises at least one channel that is moveable between a first position, in which the at least one channel is positioned to form at least one passageway connecting the first and second compartments, and a second position, in which the at least one channel is positioned so that the first and second compartments are separated;
   a lid detachably engaged with the second compartment, wherein the drink bottle is adapted to allow consumable beverage from the first compartment to enter the second compartment when the at least one channel is in the first position.

13. The drink bottle of claim 12, wherein the first and second compartments are threadably attached.

14. The drink bottle of claim 12, wherein the at least one channel is moved between the first and second positions by rotating the lid.

15. The drink bottle of claim 12, wherein the second compartment comprises:
   a base plate which defines at least one opening therethrough;
   a rotateable plate rotateably connected to the base plate and defining the at least one channel therethrough, wherein the at least one opening and the at least one channel are aligned to form at least one passageway when the rotateable plate is configured so the at least one channel is in the first position.

16. The drink bottle of claim 15, further comprising:
   at least one guide post located on the rotateable plate; and
   at least one shaft located on an inner surface of the lid and configured to engage the at least one guide post so that rotating the lid will rotate the rotateable plate.

17. The drink bottle of claim 16, wherein the drink bottle includes two guide posts and two shafts, wherein the two shafts engage the two guide posts by sliding over a portion of the two guide posts.

18. The drink bottle of claim 16, wherein the rotateable plate includes a guide slot along a portion of a perimeter thereof.

19. The drink bottle of claim 18, wherein the rotateable plate includes first and second protuberances which extend into the guide slot.

20. The drink bottle of claim 19, further comprising a stop located in the second compartment for slidable engagement with the guide slot, wherein the first and second protuberance are configured to provide resistance against the rotateable plate being moved so that the at least one channel is moved from any one of the first and second positions.

21. A reusable two compartment drink bottle for a consumable beverage, the drink bottle comprising:
a first compartment defining a cavity adapted to hold the consumable beverage;
a second compartment located on the first compartment and adapted to hold at least one additive, the second compartment comprises at least one channel that is moveable between a first position, in which the at least one channel is positioned to form at least one passageway connecting the first and second compartments, and a second position, in which the at least one channel is positioned so that the first and second compartments are separated;
a lid detachably engaged with the second compartment, the drink bottle is adapted to allow consumable beverage from the first compartment to enter the second compartment when the at least one channel is in the first position, wherein the at least one channel is moved between the first and second positions by rotating the lid.

22. The drink bottle of claim 21, wherein the second compartment comprises:
a base plate which defines at least one opening therethrough;
a rotateable plate rotateably connected to the base plate and defining the at least one channel therethrough, wherein the at least one opening and the at least one channel are aligned to form at least one passageway when the rotateable plate is configured so the at least one channel is in the first position.

23. The drink bottle of claim 22, wherein the rotateable plate includes a shaft which extends through a bore in the base plate, a terminal end of the shaft including a flange for securing the shaft within the bore.

24. The drink bottle of claim 22, further comprising:
at least one guide post located on the rotateable plate; and
at least one shaft located on an inner surface of the lid and configured to engage the at least one guide post so that rotating the lid will rotate the rotateable plate.

25. A method of assembling a drink bottle, comprising:
providing a first compartment defining a cavity adapted to hold a consumable beverage therein, the first compartment defining a mouth;
providing a second compartment adapted to hold at least one additive;
attaching the second compartment to the first compartment such that the mouth can be sealed closed;
attaching a lid to the second compartment, wherein rotating the lid in a first direction results in the creation of at least one passageway between the first and second compartments and rotating the lid in a second, opposite direction results in separating the first and second compartments, wherein operation of the drink bottle does not reduce the drink bottle's capability of again separating the first and second compartments of the drinking bottle thus allowing the drinking bottle to be reused to again keep another consumable beverage and another at least one additive separate using the first and second compartments.

26. The drink bottle of claim 1, wherein the drink bottle is configured so that after the at least one passageway is used to mix the consumable beverage and at least one additive, the at least one channel can be moved into the second position such that the drink bottle is again configured to keep the first and second compartments separate.

27. The drink bottle of claim 12, wherein the drink bottle is configured so that after the at least one passageway is used to mix the consumable beverage and at least one additive, the at least one channel can be moved into the second position such that the drink bottle is again configured to keep the first and second compartments separate.

28. The drink bottle of claim 21, wherein the drink bottle is configured so that after the at least one passageway is used to mix the consumable beverage and at least one additive, the at least one channel can be moved into the second position such that the drink bottle is again configured to keep the first and second compartments separate.

29. A reusable two compartment drink bottle for a consumable beverage and adapted to at least one of heat and cool the consumable beverage, the drink bottle comprising:
a first compartment defining a cavity adapted to hold the consumable beverage, the first compartment comprising:
an inner panel forming the cavity;
an outer panel, in combination with the inner panel, forms a chamber generally coextensive with the outer panel; and
a thermal energy storage material located within the chamber;
a second compartment located on the first compartment and adapted to hold at least one additive, the second compartment comprises at least one channel that is moveable between a first position, in which the at least one channel is positioned to form at least one passageway connecting the first and second compartments, and a second position, in which the at least one channel is positioned so that the first and second compartments are separated;
a lid located on the second compartment, wherein the drink bottle is adapted to allow consumable beverage from the first compartment to enter the second compartment when the at least one channel is in the first position.

* * * * *